(12) United States Patent
Rodman

(10) Patent No.: US 8,337,740 B2
(45) Date of Patent: Dec. 25, 2012

(54) REINFORCED INTERNAL COMPOSITE STRUCTURES

(76) Inventor: William L. Rodman, Bellevue, WA (US)

( * ) Notice: Subject to any disclaimer, the term of this patent is extended or adjusted under 35 U.S.C. 154(b) by 283 days.

(21) Appl. No.: 12/565,602

(22) Filed: Sep. 23, 2009

(65) Prior Publication Data

US 2010/0164147 A1  Jul. 1, 2010

Related U.S. Application Data

(60) Provisional application No. 61/099,384, filed on Sep. 23, 2008.

(51) Int. Cl.
B29C 70/48 (2006.01)
(52) U.S. Cl. ........ 264/314; 264/257; 264/258; 264/316; 264/338
(58) Field of Classification Search .............. 264/257, 264/258, 314, 316, 338
See application file for complete search history.

(56) References Cited

U.S. PATENT DOCUMENTS

| | | | |
|---|---|---|---|
| 4,212,621 A | 7/1980 | Michelotti | |
| 4,363,617 A | 12/1982 | Hirsekorn | |
| 4,822,272 A | 4/1989 | Yanase et al. | |
| 5,000,990 A * | 3/1991 | Freeman | 428/36.1 |
| 5,087,193 A * | 2/1992 | Herbert, Jr. | 425/543 |
| 5,484,277 A * | 1/1996 | Lindsay | 425/388 |
| 5,593,633 A | 1/1997 | Dull et al. | |
| 5,909,414 A | 6/1999 | Ohta | |
| 6,159,414 A * | 12/2000 | Tunis et al. | 264/510 |
| 6,257,858 B1 | 7/2001 | Pabsch et al. | |
| 6,286,785 B1 | 9/2001 | Kitchen | |
| 6,533,985 B1 | 3/2003 | Smith | |
| 6,773,655 B1 | 8/2004 | Tunis, III et al. | |
| 6,796,784 B1 | 9/2004 | Andre | |
| 6,818,159 B2 | 11/2004 | Hlnz | |
| 6,896,841 B2 * | 5/2005 | Velicki et al. | 264/510 |
| 2003/0030177 A1 * | 2/2003 | Kia et al. | 264/219 |
| 2004/0183227 A1 * | 9/2004 | Velicki et al. | 264/236 |
| 2007/0175577 A1 | 8/2007 | Dagher et al. | |

FOREIGN PATENT DOCUMENTS

| | | |
|---|---|---|
| EP | 0234341 | 9/1987 |
| EP | 1234654 | 8/2002 |
| EP | 1602470 | 12/2005 |
| WO | WO99/04964 | 2/1999 |
| WO | WO2005/105417 | 11/2005 |

* cited by examiner

Primary Examiner — Christina Johnson
Assistant Examiner — Saeed Huda
(74) Attorney, Agent, or Firm — Richard C. Vershave; Foster Pepper, PLLC

(57) ABSTRACT

A complex-shaped, three-dimensional fiber reinforced composite structure may be formed by using counteracting pressures applied to a structural lay-up of wetted fibers. The wetted fibers are arranged on pressurizable members and may be configured to include internal structural features, such as shear webs. A reinforcement stiffener may be located adjacent to at least one of the pressurizable members and the wetted fibers that form the internal structural feature. The reinforcement stiffener includes a modulus of elasticity that is substantially higher than a modulus of elasticity of the resin used to wet the fibers. In one embodiment, the reinforcement stiffener may be received in a pocket of one of the pressurizable members and may include a releasing agent that permits removal of the stiffener after the composite structure has been pressurized and cured.

12 Claims, 8 Drawing Sheets

REINFORCED INTERNAL COMPOSITE STRUCTURES

PRIORITY CLAIM

This application claims priority from U.S. Provisional Patent Application No. 61/099,384 filed on Sep. 23, 2008; the subject matter of which is incorporated herein by reference in its entirety.

FIELD OF THE INVENTION

The invention is generally related to producing large, complex-shaped, three-dimensional, fiber reinforced composite structures, and more specifically to reinforcing various portions of the component or structure during the manufacturing process.

BACKGROUND OF THE INVENTION

A composite component or structure, referred to hereinafter as simply composite structure, is a term generally used to describe any part consisting of at least two constituents that are combined yet retain their physical and chemical identities. One type of composite structure is a particulate reinforced composite (PRC) in which particulates of a selected material are embedded or bonded into a matrix. An advanced composite structure is a term generally used to describe fibers of high strength and modulus embedded in or bonded to a matrix, such as a resin, metal, ceramic, or carbonaceous matrix. The fibers may be continuous fibers, short fibers, or whiskers. The resin type matrix may be a polymerized synthetic or a chemically modified natural resin, which may include but is not limited to thermoplastic materials such as polyvinyl, polystyrene, and polyethylene and thermosetting materials such as polyesters, epoxies, and silicones. Typically, a distinct interface or boundary is present between the fibers and the matrix material. It is appreciated that the composite structure produces a combination of properties that cannot be achieved with either of the constituents acting alone.

The composite structure is typically produced by a multistep process that begins with laying up the fibers generally in swatches of material known as laminates or plies on an impervious surface. To form the matrix about the fiber plies, the plies may be pre-impregnated with the matrix material or may be un-impregnated. The un-impregnated fibers may be embedded or bonded in the matrix material by using injection molding, reaction injection molding (RIM), resin infusion, or other matrix embedding or bonding techniques. Once the fiber plies are arranged in a desired configuration, compaction techniques such as vacuum bagging are advantageously employed to remove voids from the fiber plies. The matrix material surrounding the plies may be cured employing ovens, electron beams, ultraviolet, infrared light sources, autoclave cured. Curing may be carried out at room (i.e., ambient) or elevated temperatures.

One existing manufacturing process for producing large, complex-shaped, three-dimensional, fiber reinforced composite structures includes arranging fiber plies arranged on plaster mandrels to form the complex shape. Fiber reinforced plies are laid up and impregnated on the plaster mandrels, which have been previously varnished to seal them. The resulting structure is vaccuum bagged and cured in an autoclave. The plaster mandrel is removed by striking it through the laid up, crumbling the plaster mandrel to leave the hollow composite structure. This technique is commonly used to produce structures such as complex-shaped, air conditioning ducts. This type of tooling may include locking features that hold the tool's complex shape.

If the strength of the component is at issue, steel, aluminum, or invar tooling materials may be used to create shapes that can be fastened or otherwise coupled together to create a mold surface for laying up the fiber plies. For example, an auxiliary power unit inlet duct for an airplane typically requires structural materials that exceed the strength requirements obtainable from the plaster mandrel techniques described above.

Another method of producing large composite core structures formed by vacuum assisted resin transfer molding is described in U.S. Pat. No. 6,159,414 to Tunis, III et al. (Tunis). Tunis describes making composite structures by employing hollow cell or foam block cores. The cores may be wrapped with a fiber material and arranged in a mold such that the fiber material forms a face skin. The assembly is sealed under a vacuum bag to a mold surface. One or more main feeder conduits communicate with a resin distribution network of smaller channels, which facilitates flow of uncured resin into and through the fiber material. The resin distribution network may comprise a network of grooves formed in the surfaces or the cores and/or rounded corners of the cores. The network of smaller channels may also be provided between the vacuum bag and the fiber material, either integrally in the vacuum bag or via a separate distribution medium. Resin, introduced under vacuum, travels relatively quickly through the main feeder channel(s) and into the network of smaller channels. After penetrating the fiber material to reach the surface of the cores, the resin again travels relatively quickly along the cores via the grooves in the cores or the spaces provided by the rounded corners to penetrate the fiber material wrapped around and even between the cores. The resin is then cured in an autoclave after impregnating the fiber material to form a three-dimensional fiber reinforced composite structure.

The aforementioned technologies may have a propensity to buckle, warp or otherwise undesirably distort various structural features of the fiber-reinforced structure. For example, shear webs, plates and other planar surfaces that do not come into contact with the tool may buckle during the autoclave and cure process. The buckling of a shear web, for example, may distort the web into an undesired shape normal to its planar surface.

SUMMARY OF THE INVENTION

The present invention generally relates to complex-shaped three-dimensional fiber reinforced composite structures and methods of making the same using autoclave, oven or other techniques while minimizing buckling, warping, distortion or other undesirable phenomena during the manufacturing process. One aspect of the invention provides a method for manufacturing complex-shaped, three-dimensional composite structures using counteracting acting pressures applied to a structural lay-up of fiber plies where these pressures cooperate with one or more stiffeners abutted against a structural feature, such as, but not limited to, a shear web, a plate, or some other curved or non-curved surface that does not come into primary contact with the tool during the autoclave and cure process, to maintain a desired shape of that structural feature. The shape-maintaining stiffener preferably includes a modulus of elasticity that is substantially larger than a modulus elasticity for the pressurizable members used for the lay up surfaces of the composite structure as described in U.S. patent application Ser. No. 11/835,261. Hence, the complex-shaped, three-dimensional composite structures may be formed to include stiffening, strengthening, or other desired engineering features located in the tooling or mold cavity. For exemplary purposes, these engineering features may take the form of shear webs, outstanding flanges, joint reinforcements, and integral I-beams.

In accordance with an aspect of the invention, a method of making a composite structure includes the steps of (1) obtaining at least two pressurizable members having sufficient rigidity for supporting fiber plies thereon, each of the pressurizable members having a desired shape before pressurization that includes an outer surface and an inner surface defining a volumetric region, each of the pressurizable members further having an opening to permit internal pressurization thereof; (2) arranging fiber plies wetted with a resin to form at least one structural member located between the at least two pressurizable members; (3) positioning at least one stiffener adjacent the structural member and further positioning the at least one stiffener between and in contact with one of the pressurizable members and the wetted fiber plies, the at least one stiffener having a modulus of elasticity that is substantially larger than a modulus of elasticity of the resin; (4) placing a composite assembly into a mold, wherein the composite assembly includes an arrangement of the pressurizable members, the fiber plies and the stiffener; (5) pressurizing an outer surface of the composite assembly with a first pressure; and (6) pressurizing the inner surface of the pressurizable members with a second pressure, wherein the first pressure and the second pressure operate to compress the fiber plies while the at least one stiffener maintains a desired shape of the web structure during pressurization.

In accordance with another aspect of the invention, a composite assembly includes pressurizable members having sufficient rigidity for supporting resin-wetted fibers in a desired shape before pressurization, each pressurizable member having an outer surface and an inner surface forming a wall that defines a volumetric region, wherein the resin-wetted fibers are arranged to form at least one structural member located between adjacent pressurizable members; and at least one stiffener located adjacent the structural member and further located between and in contact with one of the pressurizable members and the resin-wetted fibers, the at least one stiffener having a modulus of elasticity that is substantially larger than a modulus of elasticity of the resin used for wetting the fibers, wherein the wetted fibers are compressible to a reduced volume due to counteracting pressures applied to the wetted fibers.

BRIEF DESCRIPTION OF THE DRAWINGS

Preferred and alternative embodiments of the present invention are described in detail below with reference to the following drawings.

DETAILED DESCRIPTION OF THE INVENTION

A complex-shaped, three-dimensional fiber reinforced composite structure may be formed by using counteracting acting pressures applied to a structural lay-up of fiber plies. The fiber plies are arranged on pressurizable members that become an integral part of the final product, or may be removed, depending on the accessibility of the member. In a preferred embodiment, the pressurizable member is a hollow rotomolded thermoplastic member, a blow molded thermoplastic member, a superplastic formed metallic member, or a twin sheet vacuum formed member (TSVF) having an opening or vent. An opening or vent allows an inner surface of the pressurizable member to be vented or pressurized such that it is expanded or inflated against the fiber plies. Advantageously, the vented pressurizable member allows the complex-shaped, three-dimensional fiber reinforced composite structure to be produced using elevated temperature, pressure, and/or autoclave techniques. By means of the opening, pressure within the pressurizable members may be equalized as temperature rises or additional pressure may be applied, as in the use of an autoclave. In one embodiment, a number of the pressurizable members which may be of different sizes and have complex shapes, are arranged to form a large, complex-shaped lay-up surface for the fiber plies.

The ability to equalize the pressure in the pressurizable members allows for the production of complex-shaped, three-dimensional structures such as frames, intercostals, ribs, etc. and further permits the fiber plies to maintain their correct geometric shape. The production of these features often necessitates the creation of interior walls, flanges, shear webs and other structural design features, referred to herein as unsupported, free or internal features that are generally defined as having opposing surfaces adjacent to pressurizable members or as not having a primary surface situated between a pressurizable member and a tooling or mold surface. To support these internal features a high-modulus reinforcement stiffener may be used to substantially maintain a desired shape of the internal feature and thus minimize buckling, warping or unwanted distortion. The production of the composite structure is described below with reference to FIGS. 1A-5; whereas the production of the internal structural features in combination with the reinforcement stiffener is described with reference to FIGS. 6 and 7.

Figure 1A:
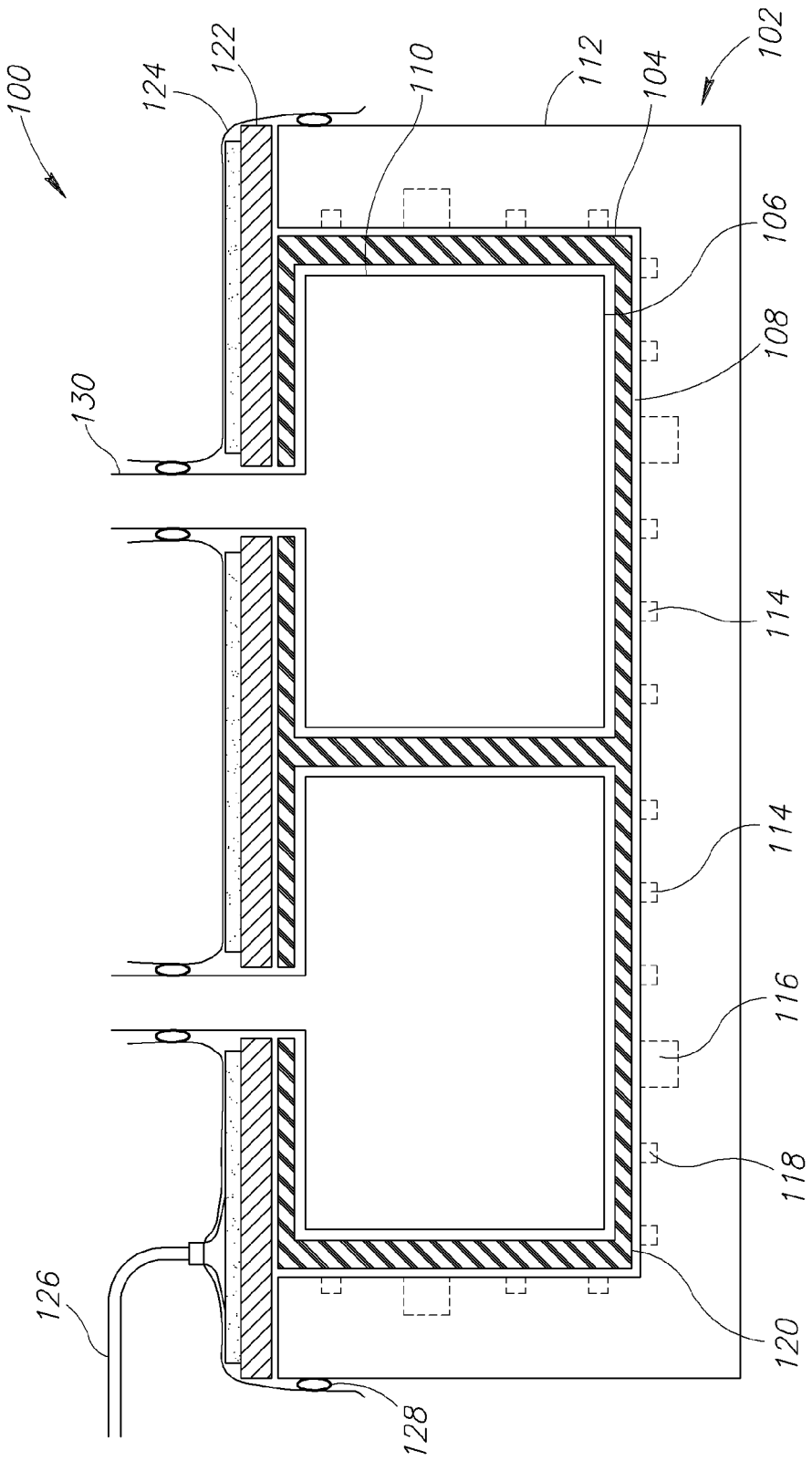
FIG. 1A schematically shows a method of making a complex shaped, three-dimensional composite structure in a mold optionally having resin feeder grooves where fiber plies are arranged on sufficiently rigid pressurizable members and pressurized within the mold using a bagging film according to an embodiment of the invention.

FIG. 1A schematically shows an autoclave system 100 having a tooling assembly or mold 102 according to an embodiment of the invention. Fiber plies 104 are arranged on pressurizable members 106 and the resulting assembly 108 is placed in the mold 102. The arrangement of the fiber plies 104 and the manufacturing of the pressurizable members 106 will be described in greater detail below. For purposes of clarity only, the illustrated embodiment shows the outer surface 110 of the pressurizable members 106 as separated or spaced apart from the fiber plies 104. However, during assembly, it is appreciated that the fiber plies 104 are laid up directly onto the outer surface 110 of the pressurizable members 106.

The mold 102 is a leak tight system having a mold body 112 optionally formed with feeder grooves or channels 114 to infuse matrix material (not shown) into or sufficiently wet the fiber plies 104. The feeder grooves 114 may include main feeder grooves 116 and distribution channels 118. Alternatively, the feeder grooves 114 may be included in the pressurizable members 106, which is an embodiment described below. However in many instances, it is preferable to include the feeder grooves 114 into the mold 102 to minimize matrix material pockets, uneven matrix material surfaces, or similar matrix material-related imperfections that could affect the quality of the finished fiber reinforced composite structure. For aerospace components, it is generally considered an unacceptable design condition to have matrix material pockets, uneven matrix material surfaces, or similar matrix material-related imperfections because such imperfections may increase the likelihood of cracking in the residual matrix material. Accordingly, it is preferable to form the feeder grooves 114 into the mold body 112. In one embodiment, the mold 102 is a tightly (i.e., close tolerance) machined clamshell type mold 102.

In one embodiment, a removable, stiffened peel ply 120 may be laid up or take the form as an outer layer or outer ply on the outer surface 110 of the fiber plies 104. The stiffened peel ply 120 could then be peeled or otherwise separated from the fiber plies 104 after the matrix material is cured. By way of example, the stiffened peel ply 120 permits the matrix material associated with the feeder grooves 114 to be peeled away from fiber plies 104 during finishing operations (i.e., post matrix material cure). There are numerous means of injecting or infusing the fiber plies 104 with matrix material and once a decision to use tool side feeder grooves 114 is made, the arrangement, volumetric flow rate, and volumetric capacity, for example, of the feeder grooves 114 may be optimized or otherwise controlled for the particular structural component being manufactured.

As temperature is increased, the different matrix materials may be utilized to achieve improved results. For example and when the matrix material comprises a resin, a number of different resins may be employed based on the processing temperature, for example a polyethylene resin may be used at low temperatures, an epoxy, phenolic, or bismaleimide resing at medium temperatures, and finally a polyimide resin at higher temperatures. In addition to the above, other resins such as nylon, polyethersulfone (PES), polyetherimide (PEI), or acetal may be used to customize the fiber-reinforced structure.

In the illustrated embodiment, the mold 102 further includes a caul sheet 122, a bagging film 124, and a probe 126. The caul sheet 122 may be coupled to the mold body 112 to secure the fiber plies 104 and the pressurizable members 106 within the mold 102. The caul sheet 122 may take the form of a sheet or plate material that is generally placed in immediate contact with the fiber plies 104 during curing to transmit normal pressure and provide a smooth surface on the finished component. In one embodiment, the caul sheet 122 takes the form of a stiffened three ply sheet material, but may take other forms depending on the autoclave system 100 and other design considerations.

The bagging film 124 is sealed to various portions of the mold 102 with sealant 128. In addition, the bagging film 124 is sealed to sprues or pressure ports 130 extending from the pressurizable members 106. The bagging film 124 preferably takes the form of a three ply porous breather material, but may take other forms depending on the autoclave system 100 and other design considerations.

The probe 126 typically operates to place the fiber plies 104 under a vacuum pressure by removing a fluid from the mold 102. In other embodiments, however, it is appreciated that the probe 126 may operate to increase the pressure within the mold 102. The bagging film 124 may also be sealed to the probe 126 using the sealant 128. In addition, the fluid may be a gas or liquid, such as, but not limited to, air or oil.

Figure 1B:
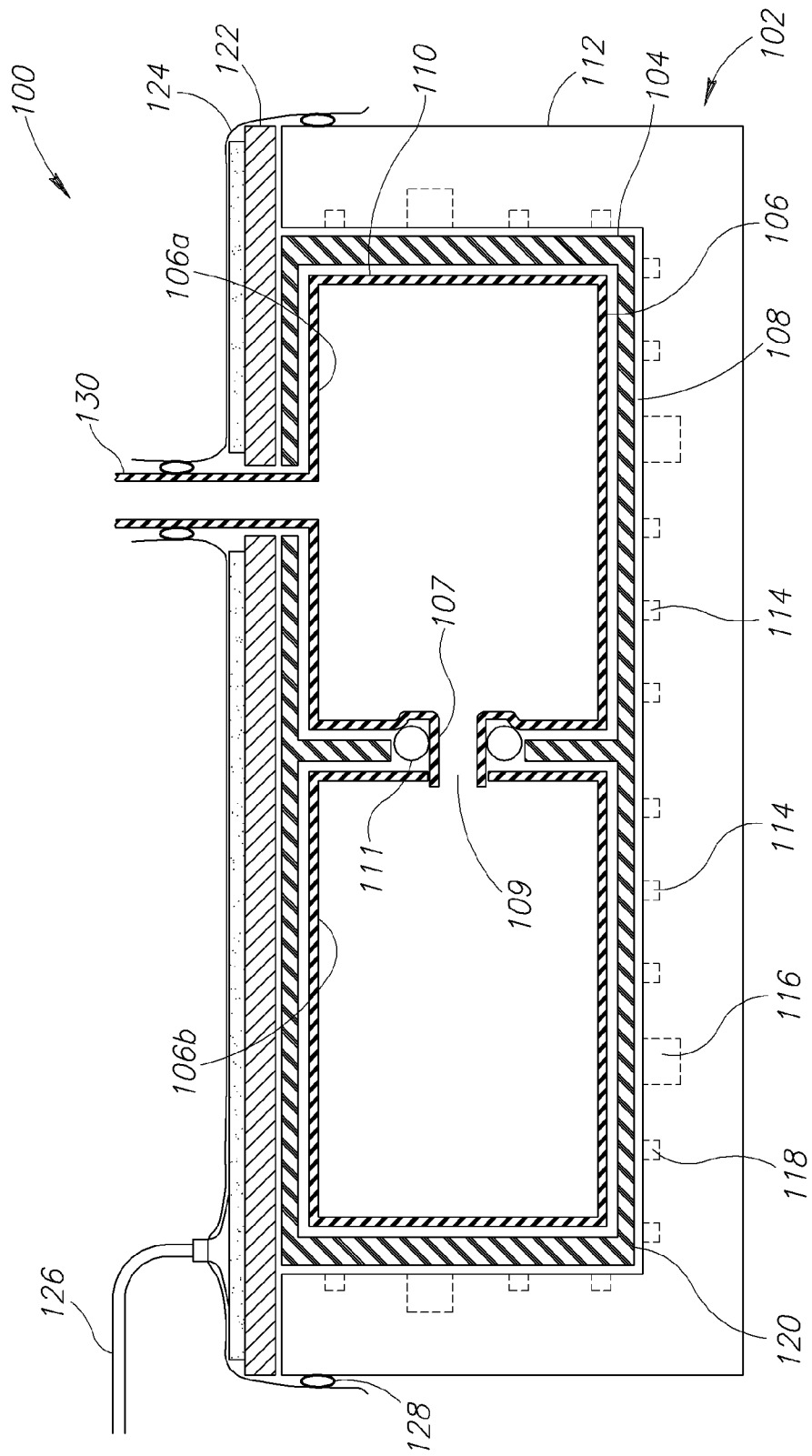
FIG. 1B schematically shows a method of making a complex shaped, three-dimensional composite structure in a mold where fiber plies are arranged on sufficiently rigid and interconnected pressurizable members within the mold according to an embodiment of the invention.

FIG. 1B schematically shows the autoclave system 100 having a tooling assembly or mold 102 according to another embodiment of the invention. The illustrated embodiment is substantially similar to the previous embodiment so that like numbers are re-used except where there are differences. In this embodiment, the fiber plies 104 are arranged on interconnecting pressurizable members 106a and 106b within the mold 102. Again and for purposes of clarity only, the illustrated embodiment shows an outer surface 110 of the pressurizable members 106a, 106b as separated or spaced apart from the fiber plies 104. However during assembly, it is appreciated that the fiber plies 104 are laid up directly onto the outer surface 110 of the pressurizable members 106a, 106b.

The interconnected pressurizable members 106a, 106b are in fluid communication with one another. As illustrated, pressurizable member 106a includes a first fluid port 107 that extends into a second fluid port 109 of pressurizable member 106b. In addition, the fiber plies 104 are arranged so they do not block or interfere with the ports 107, 109. As the pressure inside of pressurizable member 106a is changed via the single sprue 130, the pressure inside of pressurizable member 106b changes accordingly due to the fluid interconnection. To seal the pressurizable members 106a, 106b during pressurization, an amount of sealant 111 may be located around the first fluid port 107. Preferably, the sealant 111 is arranged so that it does not extrude into the fiber plies 104 during pressurization.

Figure 2:
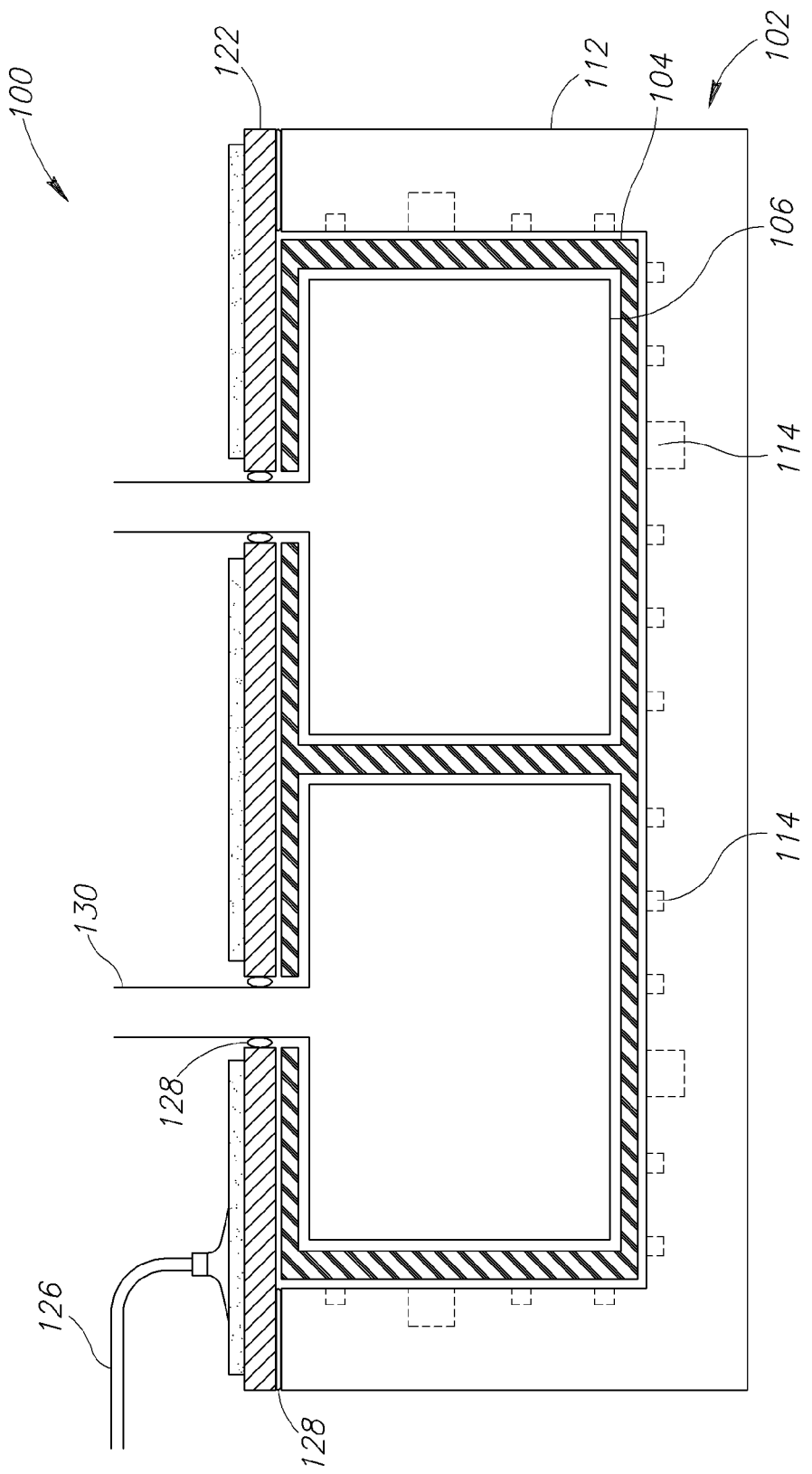
FIG. 2 schematically shows an alternative method of making a complex shaped, three-dimensional composite structure in a mold having resin feeder grooves where fiber plies are arranged on sufficiently rigid pressurizable members and pressurized within the mold using sealed mold halves according to an embodiment of the invention.

FIG. 2 shows a slightly different embodiment for pressurizing the autoclave system 100 without using the bagging film 124. In this embodiment, the caul sheet 122 is sealed against the mold body 112 of the mold 102 and the sprues 130 of the pressurizable members 106. It is appreciated that other autoclave system 100 configurations and methods of sealing the mold 102 may operate in accordance with the invention, but they will not be further described herein for purposes of brevity.

Figure 3:
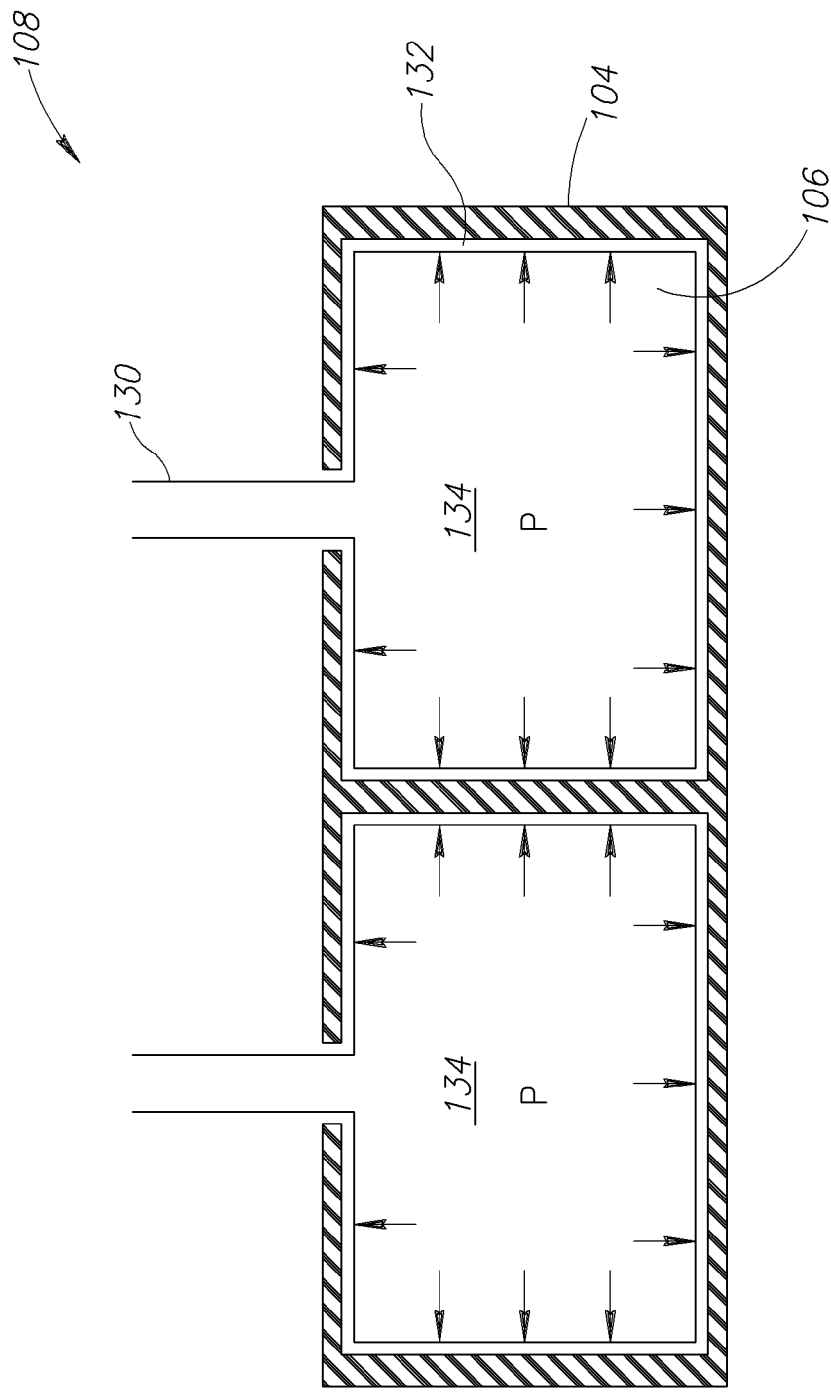
FIG. 3 shows the fiber plies arranged on the sufficiently rigid pressurizable members according to an embodiment of the invention.

FIG. 3 shows the assembly 108 comprising the fiber plies 104 and the pressurizable members 106. The pressurizable members 106 may be configured to be non-removable after the fiber plies 104 and injected or infused matrix material are cured. The integration of the pressurizable members 106 with the fiber plies 104 to make the flyaway component may or may not be accomplished by using a bondable material therebetween. When making complex flyaway components, it may be desirable to include the pressurizable members 106 as a permanent part of the flyway component. However, the type of material, the size, and the weight of the pressurizable members 106 would likely have to be closely controlled for the flyway component to meet its design requirements. For example, when making aerospace components, the thickness of the pressurizable members 106 will add to the overall weight of the flyway component. If the members 106 are too thin, or if they are not made of a durable material, then the bagging details may collapse, split or explode during pressurization and curing of the assembly 108 within the mold 102 (FIG. 1). Additionally, the presence of the pressurizable members 106 in contact with the fiber plies 104 could affect the engineering properties of the flyway component. In addition, the strength, properties, and structural reliability of the bondable material 132 will need to be tailored for each flyway component to minimize and preferably prevent crack propagation from the bondable material 132 into the cured fiber plies 104.

The pressurizable members 106 are preferably blow molded, TSVF or rotomolded thermoplastic materials with pressurizable inner chambers or volumetric regions 134. The pressurizable members 106 may be manufactured to have complex shapes, contours, and other features onto which the fiber plies 104 are arranged. Each pressurizable member 106 preferably includes at least one opening or sprue 130 to vent the hollow pressurizable member 106 to autoclave pressure or some other pressure "P." By pressurizing or venting the inner chamber 134, the pressurizable member 106 is urged against the un-cured fiber plies 104 to compress and sandwich the fiber plies 104 between the pressurizable member 106 and the mold 102. This ply compression operates to mitigate wrinkle formation in the flyway component. Because all members operate in unison and expand substantially uniformly the fiber plies are simultaneously placed in tension, which tends to minimize wrinkles in the produced component. In one embodiment, the pressurizable member may be produced from a chemically pure titanium tube in which the titanium tube is super plastically formed to create a metal matrix composite shape.

In one embodiment, the sprue 130 is used to introduce a pressure P into the chamber 134 that is greater than the autoclave pressure. After pressurizing and curing the fiber plies 104, the sprue 130 may vent gases built up in the chamber. By way of example, the sprue 130 may take the form of a fitting coupled to a fluid medium pump or other pressure source. In addition and depending on the arrangement of the assembly 108, the pressurizing and curing of the fiber plies 104 may be accomplished by pressurizing only the chambers 134 of the pressurizable members 106, thus eliminating the need for the bagging film 124 described in FIG. 1. In a preferred embodiment, impregnated (sometimes referred to as pre-impregnated) fiber plies 104 are arranged on the pressurizable member 106. The use of impregnated fiber plies may eliminate the step of injecting or infusing matrix material into the mold 102. In another embodiment, a resin transfer molding process is used to infuse resin into the fiber plies 104 and the pressurizable members 106 are pressurized without being placed in the mold 102.

In one embodiment, a plurality of pressurizable members 106 are coupled together to be in fluid communication with an adjacent pressurizable member 106 such that the fluid medium may flow freely into one of the pressurizable members 106 and simultaneously or contemporaneously pressurize all of the pressurizable members 106 that are in fluid communication with one another. One example of this embodiment is described above with reference to FIG. 1B.

The fiber plies 104 may be laid up or arranged with a 45 degree bias, which permits the pressurizable member 106 to considerably expand during the cure process. Preferably, the arrangement of the fiber plies 104 and the configuration of the pressurizable members 106 cooperate to ensure compression of all fiber plies 104 and thus prevent wrinkles during the cure process.

Figure 4:
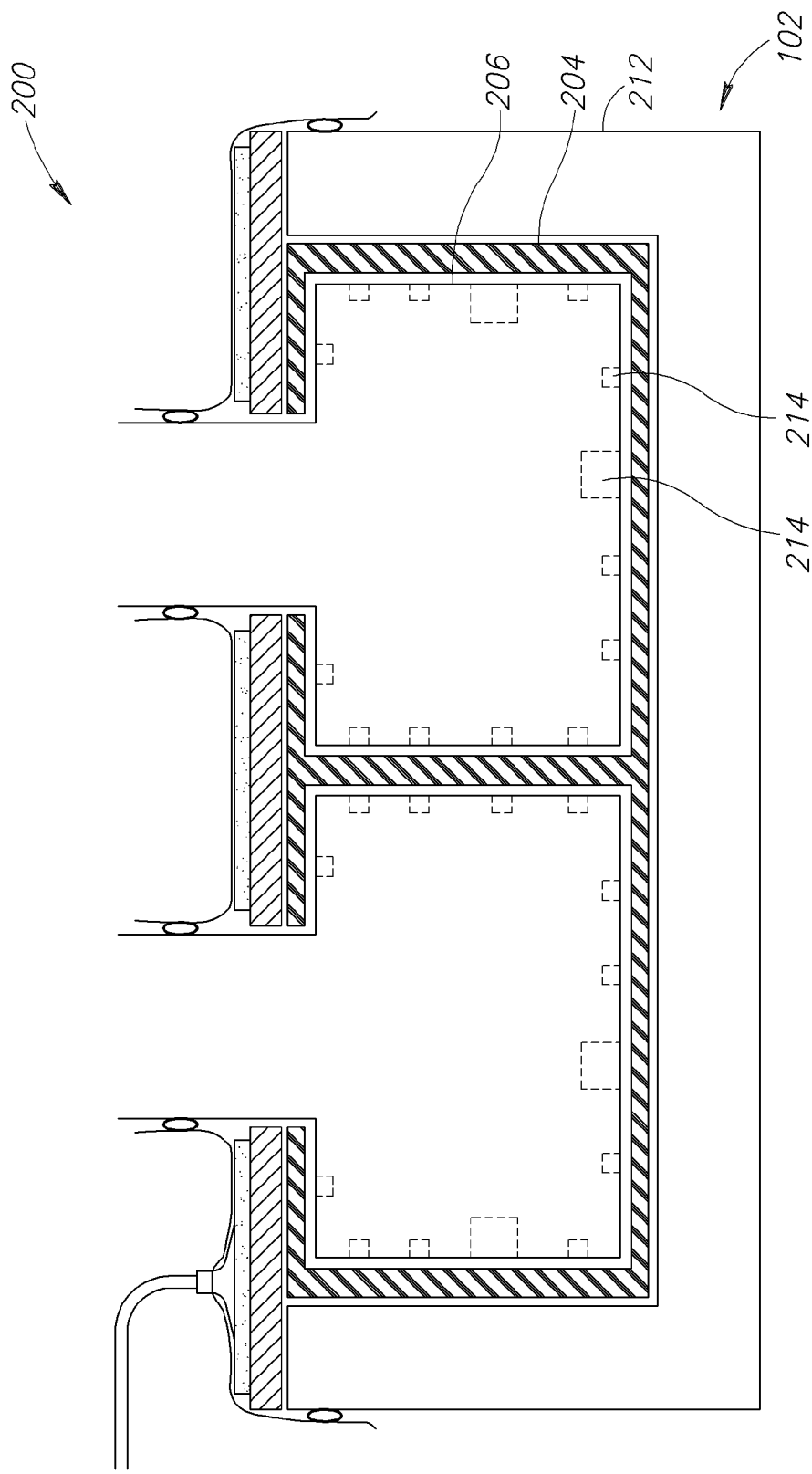
FIG. 4 schematically shows a method of making a complex shaped, three-dimensional composite structure in a mold where fiber plies are arranged on sufficiently rigid pressurizable members optionally having resin feeder grooves and pressurized within the mold using a bagging film according to an embodiment of the invention.

FIG. 4 shows an autoclave system 200 having a mold 202 comprising a mold body 212 without feeder grooves. Instead, the feeder grooves 214 are formed in the pressurizable members 206, which are configured to be removable from the fiber plies 204 after curing. The autoclave system 200, in most respects, is similar to the autoclave system 100 described above, with the only difference being that the feeder grooves 214 are formed in the pressurizable members 206. One purpose for forming the feeder grooves 214 in the pressurizable members 206 is to achieve a more desirable or more intricate matrix material distribution network. Another purpose for forming the feeder grooves 214 in the pressurizable members 206 is to reduce some of the complexity and cost of making the mold body 212. For example, when forming the matrix material distribution network in mold body 212, it is appreciated that lay-up scheme of the fiber plies 104 should be carefully thought out.

Figure 5:
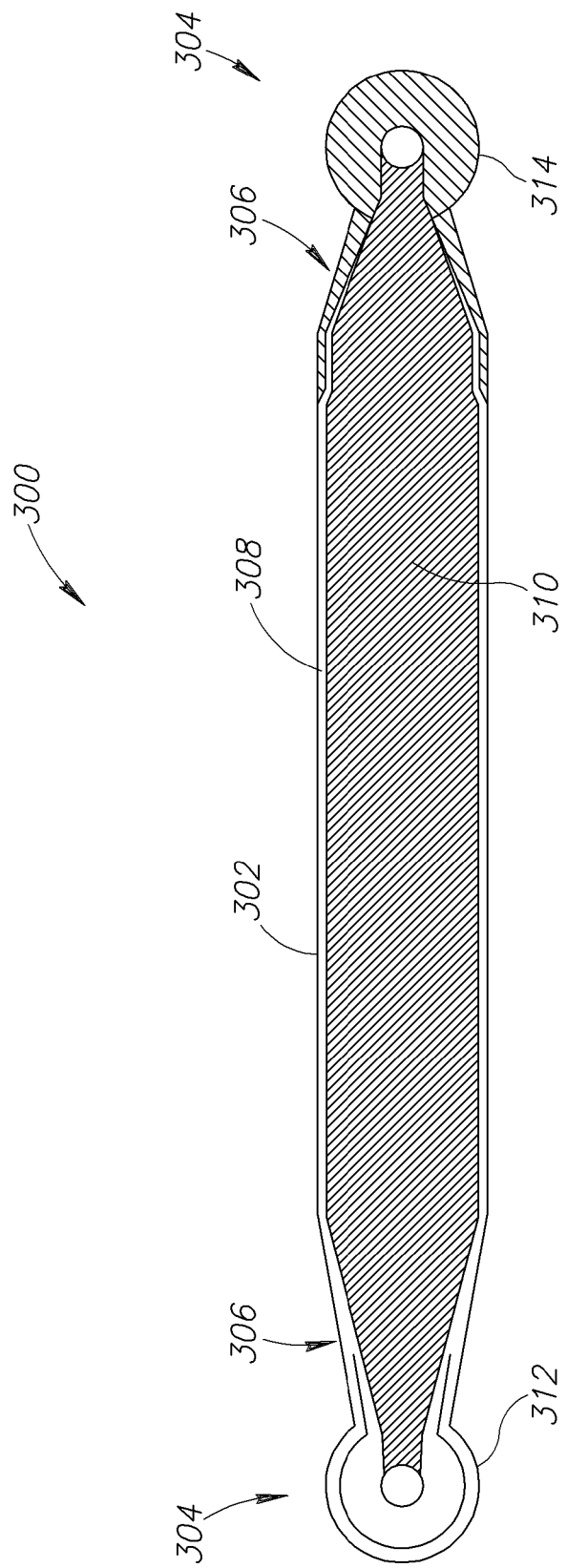
FIG. 5 shows a composite structure with fiber plies arranged on a pressurizable member to take the form of a drag link used on an aerospace vehicle according to an embodiment of the invention.

FIG. 5 shows an aerospace component 300, for example a drag link, which is a primary load path component that couples an engine nacelle to the rear spar of an airplane wing. As the engine creates thrust, load is directed through the nacelle, to the drag link 300, which transfers the load to the rear spar. Because a drag link 300 is hollow and includes a necked down configuration, it has not been possible to create this component using any of the known fiber-reinforced composite technologies given the space constraints and geometry of the drag link 300. Attempts to manufacture drag links 300 out of fiber-reinforced composite materials have been unsuccessful because it is difficult to attach metallic fittings on the ends of the composite drag links 300 because holes must be drilled in the ends of the drag link 300, but this significantly weakens the composite mating surface due to the "area out" from the drilled holes.

In the illustrated embodiment, the drag link 300 includes an elongated body 302 with fittings 304 at each end for attaching to the nacelle and rear spar, respectively. The elongated body 302, which includes the necked-down portions 306, comprises fiber plies 308 arranged on a "flyaway" pressurizable member 310. In one embodiment, the fittings 304 are fiber-composite fittings 312 integrally formed with the elongated body 302. In another embodiment, the fittings 304 are metallic fittings 314 bonded to the elongated body 302.

One method of producing the drag link involves obtaining the flyway pressurizable member 310 and arranging pre-impregnated or un-impregnated fiber plies on the pressurizable member 310. Optionally, debulk cycles may be employed to compact the plies by vacuum bagging the plies at room or at a slightly elevated temperature. In addition and further optionally, metallic inserts may be assembled into the fiber plies. The metallic inserts may take the form of removable tooling components that are pinned or secured in place to create a controlled surface or they may be metallic fittings bonded in situ. The aforementioned steps may be repeated until the uncured drag link 300 is sufficiently complete.

In one embodiment, the uncured drag link 300 may be placed in a "clam shell" type mold and the pressurizable member 310 is connected to a pressure source. The mold is closed and sealed. The pressurizable member 310 is pressurized and subjected to curing energy, such as temperature, infrared, electron beam, ultraviolet radiation or another substantially equivalent curing process. In one embodiment, the pressurizing medium may be set at a temperature, a pressure, or a combination of both to accelerate the curing process. By way of example, the pressurizing medium may be a heated liquid, such as oil, that cooperates with an ambient temperature (e.g., autoclave temperature) to more uniformly cure the drag link 300 from its interior surfaces through to its exterior surfaces. After curing, the cured drag link 300 is removed from the mold, any excess matrix material may be removed using known techniques and process, and a finish or other type of protective coating may be applied to the cured drag link 300.

In another embodiment, the pressurizable members 106 are produced using a process commonly referred to as SELECTIVE LASER SINTERING (SLS®, which is a registered trademark of 3D Systems, Inc.). Selective laser sintering uses a high power laser to rapidly fuse small particles of plastic, metal, or ceramic powders into a mass representing a desired three-dimensional object. The process selectively fuses the small particles after successively reading cross-sectional data generated and defined by a three-dimensional representation of the component to be manufactured. The component is produced by successively layered thicknesses of the small particles, where each new layer is applied on top of the previous layer until the component is complete. The SLS® process may be used to produce components from commercially available materials, such as polymers, metals and sand, preferably green sand.

Pressurizable members 106 produced using the above-described SLS® process or a substantially equivalent thereof may have a higher amount of porosity compared to pressurizable members 106 made using other processes. In some instances, the porosity levels may be acceptable, but if they are not acceptable then the porosity of the pressurizable members 106 may be reduced using a sloshing process. In one embodiment, the sloshing process includes sloshing resin or a similar substance around and thus coating the internal surface of the pressurizable member 106. Preferably, the resin operates to seal the internal surface of the pressurizable member 106 to substantially reduce or prevent movement of the fluid medium through the walls of the pressurizable member 106.

The aforementioned process, like the processes mentioned in the background section above, may have a propensity to buckle, warp or otherwise undesirably distort various structural or design (e.g., internal) features of the fiber-reinforced structure. For example, shear webs, plates and other surfaces that are located between the pressurizable members during the autoclave and cure process. The buckling of a shear web, for example, may distort the web into an undesired shape normal to its planar surface. For purposes of brevity in the present description, the structural or design features will be generically referred to as "webs" hereinafter. Because the webs are typically made with high-strength fibers embedded into thermoplastic resins, the effect of the processing pressures, temperatures, tolerances, etc. especially with respect to the thermoplastic resins should be accounted for during the design process. These effects and various proposed solutions are described below in greater detail.

Typical buckling of a pre-cured, fiber-reinforced composite web, for example, may present itself as a sinusoidal shape or bowed shape. One cause of such buckling is the coefficient of thermal expansion (CTE) of the resin in combination with a cure temperature for the composite structure. The amount of buckling that may occur could depend on one or more of the following factors: 1) The heat distortion, or, equivalently, the glass transition temperature of the resin; 2) the degree of crystalinity of the pressurizable resin; 3) The presence of a higher heat distortion resin; 4) the presence of a high modulus stiffener in the structure; 5) the use of pre-cured details in the structure; and 6) undesired or uncontrolled gaps between the pre-cured, post laid-up fiber plies and the mold or tooling surface. Attempts to control one or more of these factors may advantageously minimize or eliminate buckling, and in some case may even substantially reduce the propensity to buckle. By way of example, controlling the heat distortion temperature of the materials or the gaps may be rather straight forward to implement while providing a high modulus stiffener, such as, but not limited a steel shim or pre-cured composite detail, requires that such stiffeners be designed into the composite structure.

Controlling the heat distortion, or equivalently, the glass transition temperature of the resin may include making the resin from materials having a glass transition temperature that is higher than an ambient cure temperature and/or increasing the crystalinity of the resin. If the webs are modeled as Euler columns, the critical pressure, $P_C$, which is the pressure at which the column will buckle, is a function of the modulus of elasticity, E, divided by the change in length, $\Delta L$, squared. As shown below, $\Delta L$ is the CTE of the resin multiplied by the change in temperature during the curing cycle. Thus, $P_C$ may be controlled as shown:

$$P_C \to \frac{E}{\Delta L^2} \to \frac{E_{CureTemp}}{(CTE_{Resin} \times \Delta F)^2}$$

Further, it is appreciated that the modulus of elasticity a thermoplastic resin is dependent on its glass transition temperature and the resin may also have a high CTE, which causes notable growth and shrinkage when the temperatures change. In one embodiment, buckling or other types of distortion may be controlled when the glass transition temperature of the resin is at least 100 Fahrenheit higher than the ambient cure temperature of the composite structure.

Crystalinity of a thermoplastic resin relates to its modulus of elasticity at temperature. Crystalinity can be inherent in the material itself, or may be increased through the use of modifiers, such as glass, fibers, clay, carbon nano-tubes, and other fillers or additives. Thus, selected modifiers in the resin may reduce or eliminate buckling as well.

Figure 6:
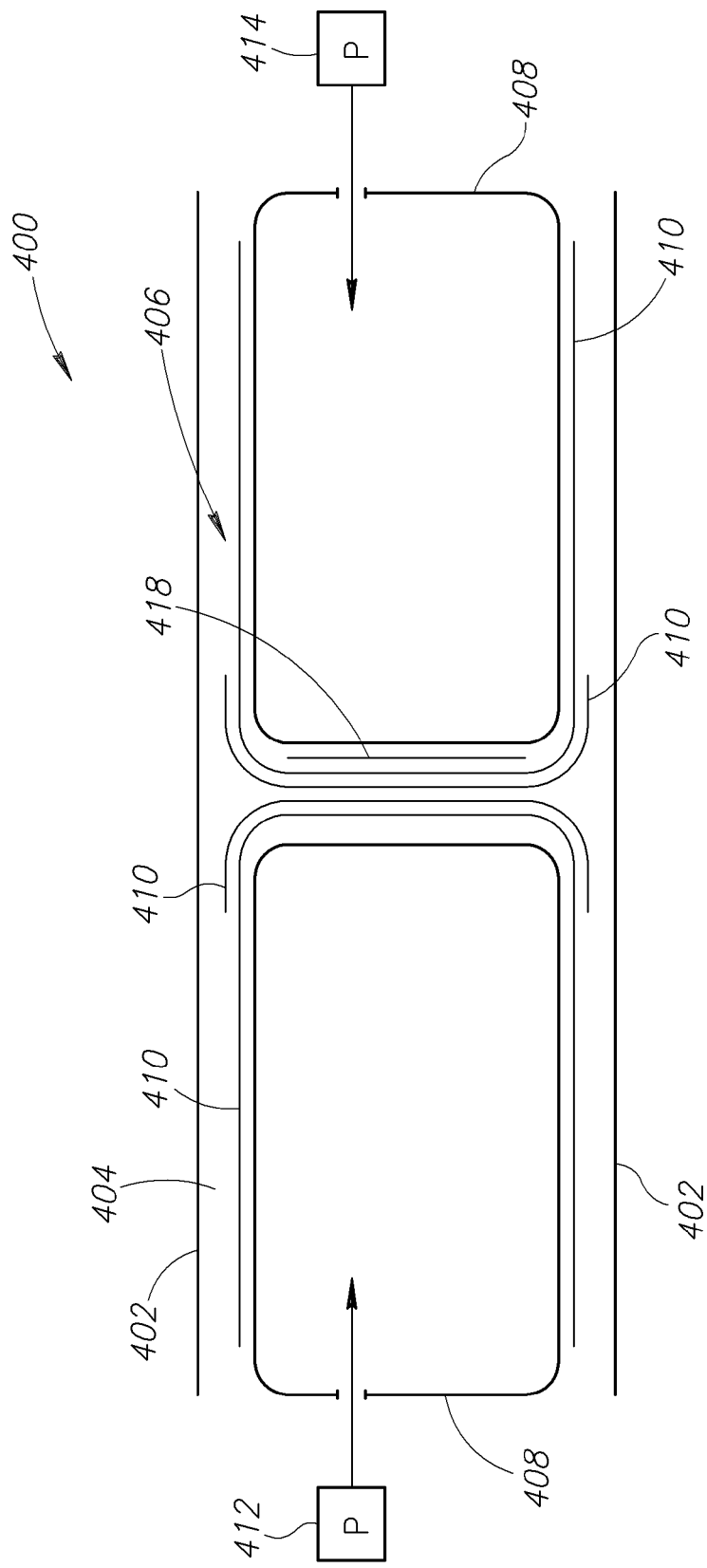
FIG. 6 is a schematic cross-sectional view of a composite structure with a stiffener for supporting an internal structural member according to an embodiment of the invention.

Referring to FIG. 6, a composite structure 400 includes a tooling surface 402 that defines a cavity 404 for a composite structure 406 having at lease two pressurizable members 408 and a plurality of fiber plies 410 arranged thereon. In the illustrated embodiment, each pressurizable member 408 may be pressurized from separate pressure sources, 412, 414, respectively; however a single pressure source may be used. The fiber plies 408 are arranged to form a shear web 416 between the pressurizable members 408. A high modulus shim or stiffener 418 may be located between one of the pressurizable members 408 and the fiber plies 410. Although one stiffener 418 is shown in the illustrated embodiment, it is appreciated that another stiffener may be incorporated symmetrically on the opposite of the web 416. For purposes of the present description, the phrase "high modules" may refer to steel, carbon composite, other metals, higher glass transition temperature material and/or higher crystalinity materials.

The degree of straightness required may dictate the thickness of the stiffener. The stiffener may be treated with a releasing agent (not shown), which helps prevent the cured resin from bonding to the pressurizable member 408. The releasing agent may advantageously permit the stiffener 418 to be removed from the post-cured composite structure without disturbing the fiber plies 410. But, depending on the design specifications, the stiffener 418 may also be integrated into the composite structure 406 as a "fly away" component.

The stiffener 418 may take the form of a high modulus (i.e., stiff) material, and as mentioned above is not limited to steel or a pre-cured composite material. In one embodiment, the stiffener 418 may be formed with a desired amount of curvature that corresponds to a desired surface shape of the post-cured fiber plies 410. In addition, the stiffener 418 may be pre-stressed with an amount of curvature to counteract a predicted amount of distortion in the fiber ply layup, which may be particularly beneficial when numerous fiber plies are employed. Thus, the stiffener 418 may take forms other than a straight or two-dimensional component, such as having a sine wave shape, a complex compound curvature, one or more radii, chamfers or bevels, etc.

In one embodiment, the stiffener 418 may take the form of a pre-cured composite detail having a variable out-of-plane stiffness over a length or height of the web 416. By way of example, this type of stiffener 418 may be laid up with any number of plies and then cut using conventional methods, such as laser or water jet cutting. In another embodiment, the stiffener 418 and the web 416 may be laid up and pre-cured on separate tooling, and then the pressurizable members 408 may be used as locating surfaces within the tool 402.

As explained above, the column buckling phenomena that may occur with webs in a composite structure may be minimized or eliminated by using a stiffener and/or other control measures. The stiffener should preferably be a thin member of a high modulus material to reduce weight. Because the pressurizable members are low modulus materials, it is appreciated that they may conform to the shape of the high modulus stiffener during pressurization thereof where the applied pressure and stiffener cooperate to provide a straight or desirably shaped web.

Figure 7:
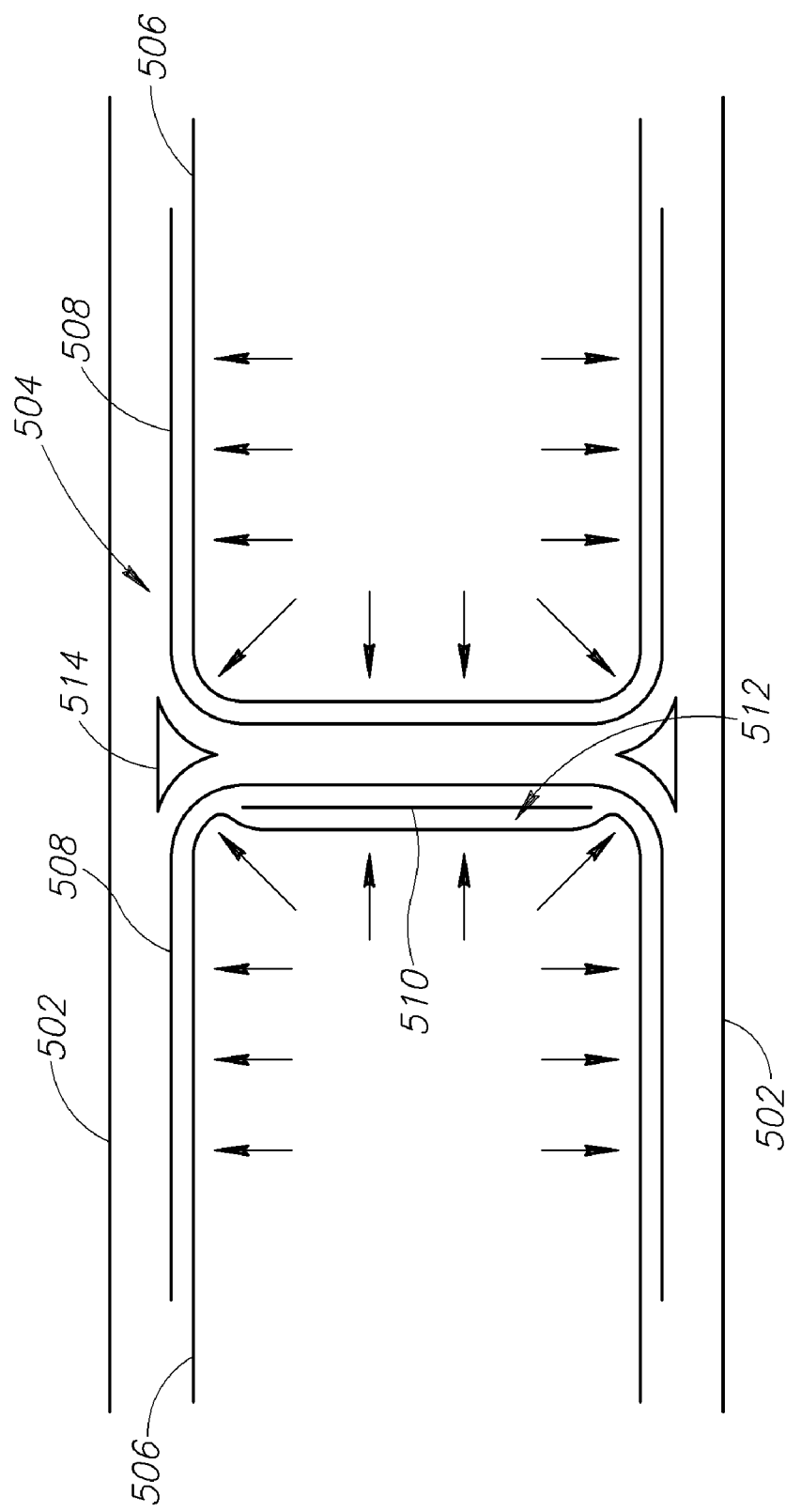
FIG. 7 is a schematic cross-sectional view of another composite structure with a reinforcement stiffener received in a pocket of a pressurizable member according to an embodiment of the invention.

FIG. 7 shows yet another embodiment of a tool 502 holding a composite structure 504 configured with pressurizable members 506, fiber plies 508 and at least one stiffener 510. In the illustrated embodiment, the pressurizable member 506 includes a recess or pocket 512 sized to receive the stiffener 510. Although such a pocket 512 may not be necessary, it may advantageously operate as an alignment mechanism for placement of the stiffener 510 during assembly of the composite structure 504 within the tool 502. In addition, the pocket 512 may operate to maintain the position of the stiffener 510 relative to the web, especially if the stiffener 510 has been treated with the releasing agent as described above. Optionally, radius fillers 514 may also be arranged on the composite structure 504 to help maintain the location of the various components within the tool 502 during assembly or placement therein.

Another method of minimizing or eliminating the buckling phenomena related to webs may be to purposely undersize the pressurizable members. One of the more complex manufacturing concerns regarding the composite structure is the interaction of the tool with the pressurizable members and fiber plies during assembly and autoclave/cure. In one embodiment, the tool tolerances should be subtractive rather than additive and a bulk factor of the laid-up fiber plies should be accounted for during assembly. Generally, the laid-up fiber plies may have a bulk factor of about 15% to about 35%. The bulk factor is the ratio of the volume of a pre-cured composite component to the volume of the finished or post-cured composite component.

As described above, aspects of the invention enable the manufacture of complex-shaped fiber-reinforced composite structures that otherwise could not be produced or would require substantial advanced and expensive assembly techniques. In addition, aspects of the invention may allow for the manufacture of a complex-shaped fiber-reinforced composite structure having substantially reduced weight when compared to a similar metallic component, enable radical new designs and structural configurations, and may lower production costs of complex-shaped fiber-reinforced composite structures.

With any one of the embodiments described above, or some combination thereof, the flyaway component may be produced as a single, monolithic component or may be made in pieces or sections that are coupled together after each piece or section is pressurized and cured.

Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method of making a composite structure, the method comprising:
    obtaining at least two pressurizable members having sufficient rigidity for supporting fiber plies thereon, each of the pressurizable members having a desired shape before pressurization that includes an outer surface and an inner surface defining a volumetric region, the desired shape of each pressurizable member being different from a final shape of the composite structure, each of the pressurizable members further having an opening to permit internal pressurization thereof;
    arranging fiber plies wetted with a resin to form at least one structural member located between the at least two pressurizable members, wherein each of the pressurizable members substantially maintains its respective, desired shape after being loaded with the fiber plies, yet before pressurization thereof;
    positioning at least one stiffener adjacent the structural member and further positioning the at least one stiffener between and in contact with one of the pressurizable members and the wetted fiber plies, the at least one stiffener having a modulus of elasticity that is substantially larger than a modulus of elasticity of the resin;
    placing a composite assembly into a mold, wherein the composite assembly includes an arrangement of the pressurizable members, the fiber plies and the stiffener;
    pressurizing an outer surface of the composite assembly with a first pressure; and
    simultaneously pressurizing the inner surface of the pressurizable members with a second pressure, wherein the first pressure and the second pressure operate to compress the fiber plies while the at least one stiffener maintains a desired shape of the web structure during pressurization.

2. The method of claim 1 wherein obtaining the pressurizable member includes obtaining the pressurizable member from the group consisting of a rotomolded thermoplastic member, a blow molded thermoplastic member, a superplastic formed metallic member, and a twin sheet vacuum formed member.

3. The method of claim 1 wherein pressurizing the inner surface of the pressurizable members includes providing access to a pressure source through an opening in at least one of the pressurizable members.

4. The method of claim 3 wherein providing access to the pressure source includes subjecting at least one of the pressurizable members to a second pressure using a second fluid medium.

5. The method of claim 1 wherein positioning the least one stiffener adjacent the web structure includes bonding the stiffener to the pressurizable member in contact therewith.

6. The method of claim 1 wherein the modulus of elasticity of the stiffener is at least ten times higher than the modulus of elasticity of the resin.

7. The method of claim 1 wherein positioning the at least one stiffener in contact with one of the pressurizable members includes placing the at least one stiffener into a recess defined by a shape of the adjacent pressurizable member.

8. The method of claim 1, further comprising removing the at least one stiffener and the pressurizable member after curing of the composite assembly.

9. The method of claim 8, further comprising treating the at least one stiffener with a releasing agent before positioning the at least one stiffener in contact with one of the pressurizable members.

10. The method of claim 1 wherein the modulus of elasticity for the stiffener is approximately equal to a modulus of elasticity for the mold.

11. The method of claim 1 wherein a coefficient of thermal expansion for the stiffener is approximately equal to a coefficient of thermal expansion for the mold.

12. The method of claim 1 wherein the resin includes a thermoplastic resin.

\* \* \* \* \*